April 30, 1935.   H. VAN BREE ET AL   1,999,671
AMALGAM MIXER
Filed June 30, 1934
Fig-1-
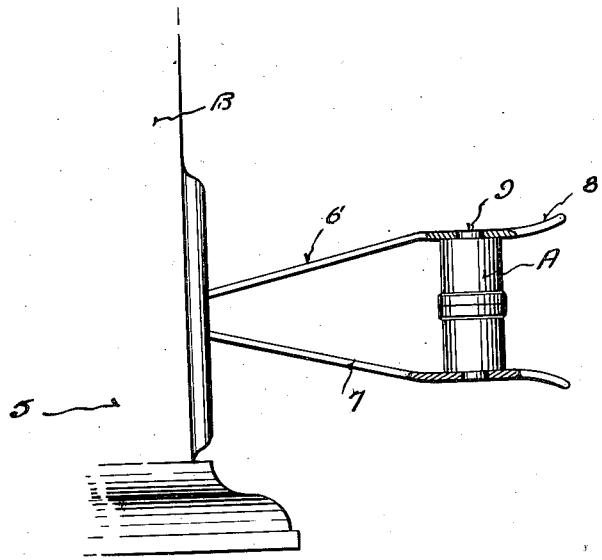
Fig-2-
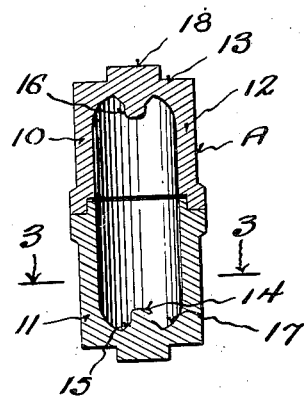
Fig-3-
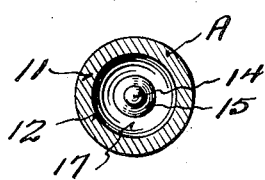
Inventors
Hubert Van Bree —
Arleen Frace —

Patented Apr. 30, 1935

1,999,671

UNITED STATES PATENT OFFICE 1,999,671

AMALGAM MIXER

Hubert Van Bree and Arleen Frace,
Racine, Wis.

Application June 30, 1934, Serial No. 733,302

1 Claim. (Cl. 259—75)

This invention appertains to dental appliances, and more particularly to a novel amalgam mixer.

One of the salient objects of our invention is the provision of a novel container, or capsule, for receiving the mix, whereby, upon agitation thereof, a perfectly blended amalgam will be had in a minimum amount of time without loss of any of the materials used.

In practice, we have found that where the container, or capsule, is provided with smooth inner ends the amalgam forms a ball, and during the reciprocation of the capsule small particles adhere to such ends, resulting in a hard mix not capable of use.

It is, therefore, another salient object of our invention to provide internal projections at each end of the capsule, or container, whereby when amalgam is placed therein and the capsule placed in motion, the amalgam will forcibly strike the sharp projections, which will cause the amalgam to fly apart, which results in perfectly blended amalgam without any of the particles adhering to the ends of the container.

A further object of our invention is the provision of a container, or capsule, formed from non-metallic material, such as plastic bakelite, molded in the desired form, whereby the adherence of the amalgam to the inner faces of the capsule is also reduced to a minimum.

With these and other objects in view, the invention consists in the novel construction arrangement and formation of parts, as will be hereinafter more specifically described, claimed and illustrated in the accompanying drawing, in which drawing:—

Figure 1 is a side elevation of our improved capsule, or container, showing the same in its operative position in the capsule holder, a fragment of the mixing machine being also illustrated, parts of the holder being shown in section.

Figure 2 is an enlarged longitudinal section through the capsule.

Figure 3 is a transverse section through the capsule, taken on the line 3—3 of Figure 2.

Referring to the drawing in detail, wherein similar reference characters designate corresponding parts through the several views, the letter A generally indicates our improved container, or capsule, and B a mixing machine with which the same can be associated.

Only a fragment of the machine B has been illustrated, but the same incudes a housing 5 for an electric motor (not shown) utilized for oscillating or vibrating the capsule holder 6. The capsule holder 6 embodies a pair of resilient arms 7, the outer ends of which are flared, as at 8, and provided with apertures 9.

Our improved container, or capsule, A embodies a pair of companion sections 10 and 11, which are preferably formed from non-metallic material, such as plastic bakelite, molded into the form shown. Each of the sections 10 and 11 includes a substantially cylindrical side wall 12 and an end wall 13. The meeting ends of the side walls 12 of the sections are provided respectively with mating tongues and grooves, whereby the sections can be firmly united.

In accordance with our invention, the inner faces of the end walls 13 are provided with inwardly directed projections 14. These projections include a tapered base 15 leading from the end walls at a substantially cylindrical end 16. The inner faces of the end walls curve away from the projections, as indicated by the reference character 17, so that a smooth surface will be formed. The projections 14 are centrally located and are longitudinally alined relative to one another.

The outer faces of the end walls 13 of the sections are provided with outwardly extending lugs 18, which are adapted to be received within the apertures 9 of the holder.

In use of our improved device, the sections 10 and 11 are taken apart and the measured quantity of amalgam is placed therein, after which the sections are again connected. The capsule is then shaken in any desired manner, such as by the use of the mixing machine B. In this instance, the resilient arms 7 are spread apart and the lugs 18 are fitted within the recesses 9.

As the capsule is oscillated or shaken back and forth, the amalgam is thrown from one end of the capsule to the other. As the amalgam hits the projections 14, the same is broken into a number of minute particles, which again join to form the ball of amalgam. The projections effectively prevent the adhering of the amalgam to the ends of the capsule and insure the proper mixing of the amalgam.

With our device, a perfect mix is obtained in a minimum amount of time without loss of any material. As a perfect mix is obtained, it is unnecessary for the dentist to knead the amalgam by hand, and this also results in the saving of time and the obtaining of a sanitary mix.

Changes in details may be made without departing from the spirit or the scope of our invention, but what we claim as new is:—

An amalgam mixer comprising, a two-part container detachably fitted together, each part including a side wall and an end wall, a centrally disposed inwardly directed projection formed on the inner face of each end wall, each of said projections including a tapered base, and the inner faces of the end walls having curved surfaces leading toward said bases.

HUBERT VAN BREE.
ARLEEN FRACE.